April 3, 1956 W. D. MAYFIELD 2,740,634
FERTILIZER SPREADER
Filed July 31, 1952 2 Sheets-Sheet 1

William D. Mayfield
INVENTOR.

April 3, 1956     W. D. MAYFIELD     2,740,634
FERTILIZER SPREADER

Filed July 31, 1952     2 Sheets-Sheet 2

William D. Mayfield
INVENTOR.

United States Patent Office 2,740,634
Patented Apr. 3, 1956

2,740,634
FERTILIZER SPREADER
William D. Mayfield, Alhambra, Calif.
Application July 31, 1952, Serial No. 301,833
3 Claims. (Cl. 275—2)

The present invention relates to new and useful improvements in fertilizer spreaders or distributors and more particularly to a hand operated apparatus of this character.

An important object of the invention is to provide a rotary distributor drum supported on a pair of wheels at the ends of the drum and an adjustable regulator for the fertilizer delivered by the drum.

A further object is to provide a vertical adjusting bar for the regulator which serves the double function of a prop for the handle of the spreader, when not in use.

Another object is to provide a device of this character of simple and practical construction, which is efficient and reliable in operation, relatively inexpensive to manufacture and otherwise well adapted for the purposes for which the same is intended.

Figure 1:
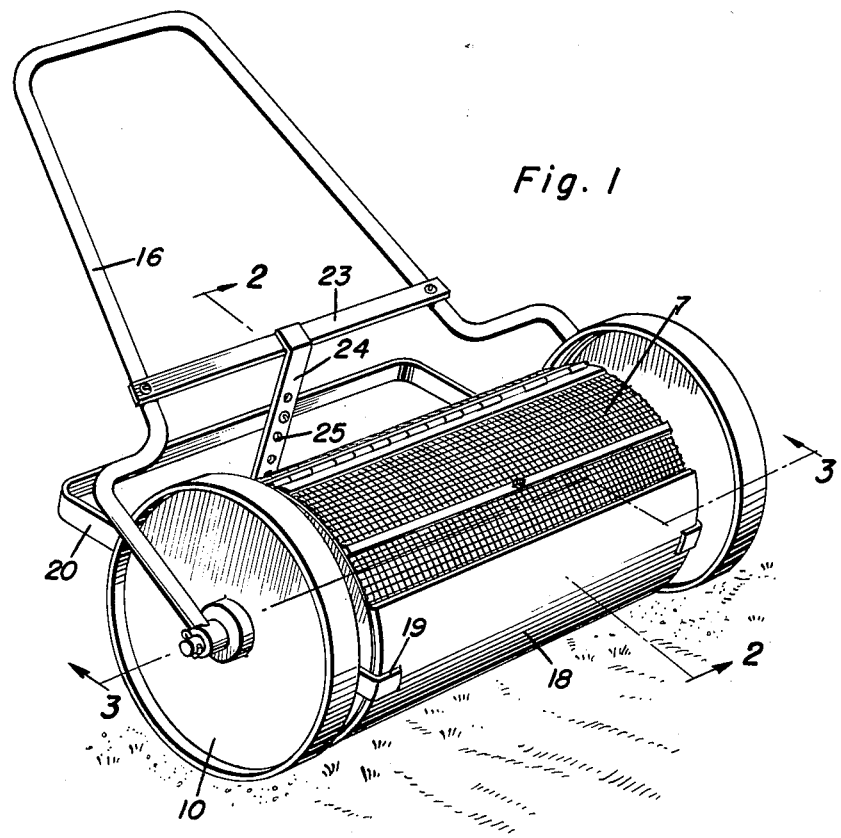
Figure 2:
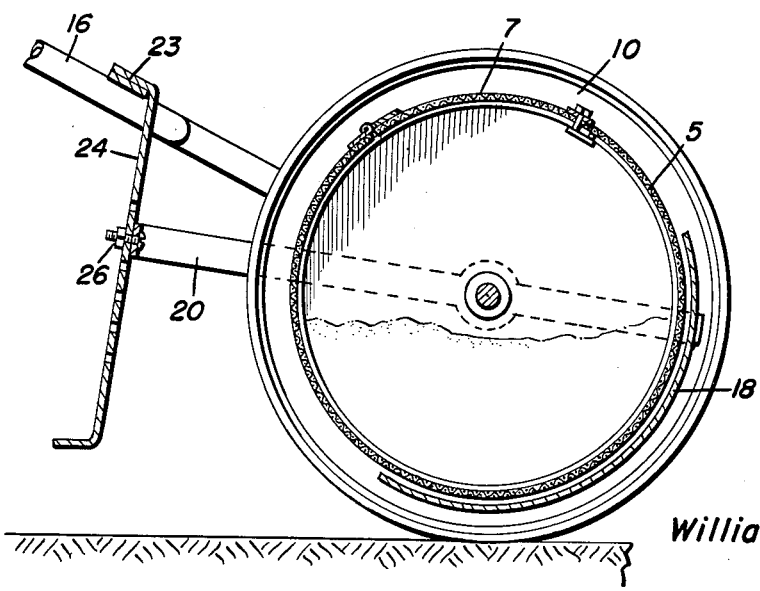
Figure 3:
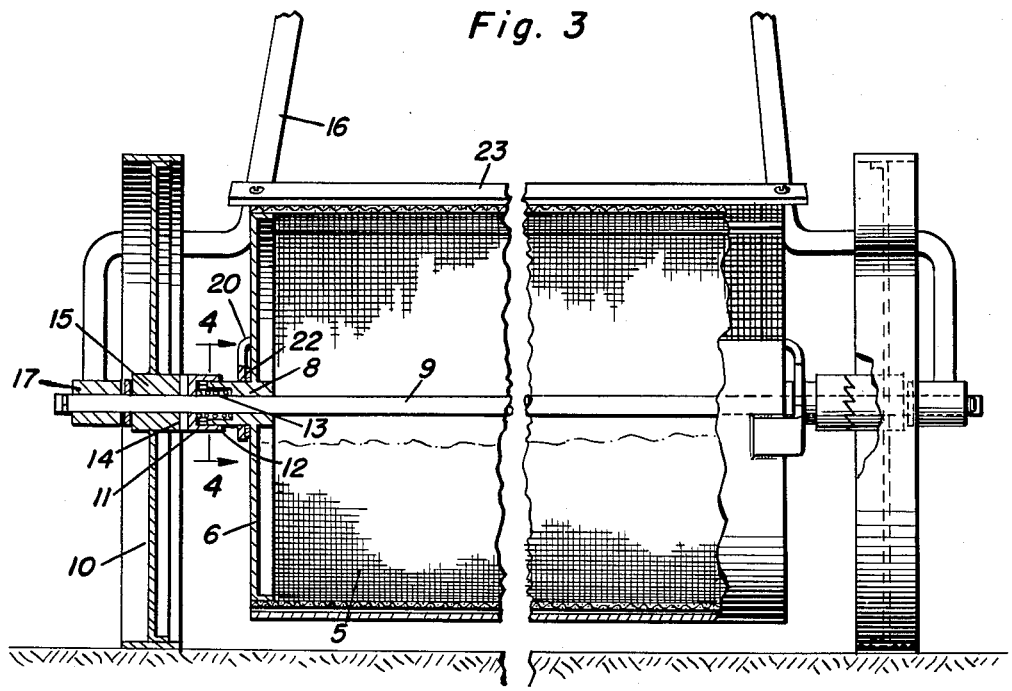
Figure 5:
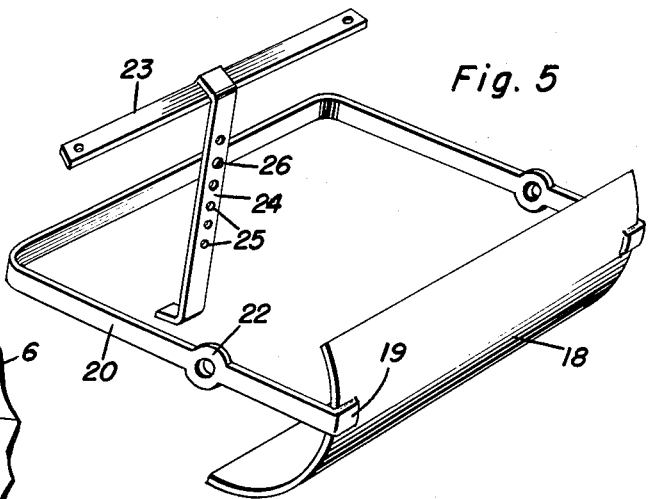
Figure 4:
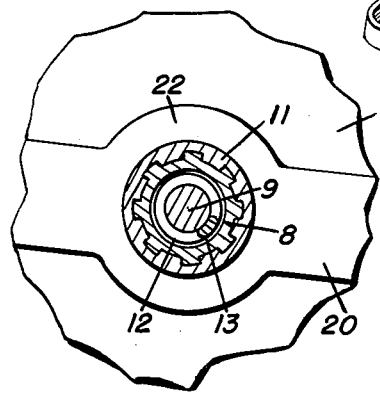

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;
Figure 2 is a transverse sectional view taken on a line 2—2 of Figure 1;
Figure 3 is a longitudinal sectional view taken on a line 3—3 of Figure 1;
Figure 4 is an enlarged transverse sectional view of the clutch for the shaft taken on a line 4—4 of Figure 3; and,
Figure 5 is a perspective view of the regulator.

Referring now to the drawings in detail, wherein for the purpose of illustration I have disclosed a preferred embodiment of my invention, the numeral 5 designates a woven wire or other suitable foraminous drum having imperforate ends 6 and a hinged door 7 for loading the drum. Each end 6 is constructed with a hub 8 to receive a shaft 9 on which the drum is rotated. A pair of wheels 10 are journaled on the shaft adjacent the ends thereof and outwardly at each end of the drum to support the drum in an elevated position.

A toothed ratcheting clutch member 11 is slidably splined on each hub 8 and the adjacent end of hub 8 is formed with a recess 12 to receive a coil spring 13 which forces the teeth of clutch member 11 into engagement with the teeth of a companion toothed clutch member 14 formed on the wheel hub 15.

A substantially U-shaped metal tubing handle 16 is formed at its ends with eyes 17 which are pivotally mounted on the outer ends of shaft 9.

An arcuate imperforate regulator plate 18 extends under drum 5 from end to end thereof and is welded or otherwise suitably secured at its side edges to the front ends 19 of a U-shaped adjusting frame 20. The sides or leg portions of frame 20 are formed with eyes 22 for pivotally mounting on the hubs 8 outwardly at each end of drum 5.

A T-shaped prop 23 is secured at its end portions in a transverse position to handle 16 rearwardly of drum 5 and the vertical leg portion 24 of the prop is formed with a vertical row of openings 25 selectively receiving a bolt and nut 26 attached to the rear transverse bar of frame 20 to secure the latter in vertically adjusted position to thus adjust regulator plate 18 upwardly or downwardly at the lower side of the drum.

In the operation of the device, fertilizer is placed in drum 5 and the drum is rotated as it is wheeled over the ground by the engagement of the clutch members 11 and 14 connecting the hubs 8 of the drum to the hubs 15 of the wheels to distribute the fertilizer to the ground.

The delivery of the fertilizer is regulated by raising or lowering handle 16 while pushing or pulling the device over the ground and this movement of the handle results in a corresponding movement of frame 20 to swing regulator plate 18 upwardly or downwardly at the underside of the drum. Frame 20 is secured in vertically adjusted position to prop 23 to adjust the position of the regulator plate under the drum in accordance with the most convenient position for holding the handle.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fertilizer spreader comprising a drum of foraminous material, a shaft on which the drum is rotatably supported, a pair of wheels at the ends of the shaft, a drive connection between the wheels and the drum, a handle pivotally connected to the shaft, an arcuate regulator plate positioned under the drum, a U-shaped frame swingably supported on the shaft and fixed to the plate, and means securing the frame in swingably adjusted position to the handle to circumferentially adjust the regulator plate relative to the drum as determined by the angle at which the handle is held.

2. A fertilizer spreader comprising a drum of foraminous material, a shaft on which the drum is rotatably supported, a pair of wheels at the ends of the shaft, a drive connection between the wheels and the drum, a handle pivotally connected to the shaft, an arcuate regulator plate positioned under the drum, a U-shaped frame swingably supported on the shaft and fixed to the plate and a prop fixed to the handle and to which the frame is adjustably secured to circumferentially adjust the regulator plate relative to the drum as determined by the angle at which the handle is held.

3. A fertilizer spreader comprising a drum of foraminous material, a shaft on which the drum is rotatably supported, a pair of wheels at the ends of the shaft, a drive connection between the wheels and the drum, a handle pivotally connected to the shaft, an arcuate regulator plate positioned under the drum, a U-shaped frame swingably supported on the shaft and to which the plate is fixed and a T-shaped prop fixed to the handle and having a vertical row of openings to selectively secure the frame in adjusted position to the prop to circumferentially adjust the regulator plate relative to the drum as determined by the angle at which the handle is held.

References Cited in the file of this patent
UNITED STATES PATENTS

| | | |
|---|---|---|
| 164,562 | Hughes | June 15, 1875 |
| 599,216 | Bird | Feb. 15, 1898 |
| 898,058 | Peter | May 26, 1908 |
| 991,790 | Lampke | May 9, 1911 |
| 1,648,720 | Clapper | Nov. 8, 1927 |
| 1,862,347 | Hawks | June 7, 1932 |
| 1,882,340 | Ryan | Oct. 11, 1932 |
| 1,897,769 | Seiser | Feb. 14, 1933 |
| 1,925,809 | Masters | Sept. 5, 1933 |